(12) United States Patent
Caramanian

(10) Patent No.: US 6,214,906 B1
(45) Date of Patent: *Apr. 10, 2001

(54) COMPOSITIONS FOR DYNAMIC BALANCING

(76) Inventor: John Caramanian, 901 Casey Cove Dr., Nokomis, FL (US) 34275

( * ) Notice: Subject to any disclaimer, the term of this patent is extended or adjusted under 35 U.S.C. 154(b) by 0 days.

This patent is subject to a terminal disclaimer.

(21) Appl. No.: 09/302,969

(22) Filed: Apr. 30, 1999

Related U.S. Application Data

(63) Continuation-in-part of application No. 08/878,371, filed on Jun. 18, 1997, now Pat. No. 5,908,883.

(51) Int. Cl.[7] .............................. C08K 3/24; C08L 63/02

(52) U.S. Cl. ......................... 523/455; 523/457; 523/458

(58) Field of Search .................................. 523/457, 455, 523/458

(56) References Cited

U.S. PATENT DOCUMENTS

| | | |
|---|---|---|
| 4,083,735 | 4/1978 | Caramanian . |
| 4,425,171 | 1/1984 | Oosaka et al. . |
| 5,008,309 | 4/1991 | Ibe et al. . |
| 5,068,265 | 11/1991 | Casey et al. . |
| 5,201,248 | 4/1993 | Ibe et al. . |
| 5,384,339 | 1/1995 | Starkey . |
| 5,418,265 | 5/1995 | Matsuzaki et al. . |
| 5,516,813 | 5/1996 | Starkey . |
| 5,707,571 | 1/1998 | Reedy . |

*Primary Examiner*—Robert Dawson
*Assistant Examiner*—D. Aylward
(74) *Attorney, Agent, or Firm*—Snell & Wilmer LLP

(57) ABSTRACT

Dynamic balancing compositions are described which include an epoxy resin component and a curing component. The curing component contains at least one of a polyamide agent or polyamine agent. The balancing compositions drastically reduce the time required for balancing because, immediately after their application, they can be rotated and balanced in the uncured state. The balancing compositions also have an increased pot life and can be colored with pigment to approximate the color of copper windings.

18 Claims, No Drawings

COMPOSITIONS FOR DYNAMIC BALANCING

CROSS-REFERENCE TO RELATED APPLICATIONS

This application is a continuation-in-part of application Ser. No. 08/878,371, filed Jun. 18, 1997, now U.S. Pat. No. 5,908,883.

FIELD OF THE INVENTION

The present invention generally relates to improved compositions for dynamic balancing. More particularly, the present invention relates to improved compositions for balancing rotors or the like, such as the armatures of motors, fan blades, blowers, computer spindles, fractional horsepower and large motors, printing rollers, paint rollers, and any other rotating elements requiring balance.

BACKGROUND OF THE INVENTION

Balancing putty and balancing compounds that include an epoxy resin and a curing agent and which are designed for application to a rotary part, such as a rotor of a motor, in order to provide for well-balanced rotation are prevalent in the prior art. For example, U.S. Pat. No. 5,008,309 issued to Ibe et al. describes a balancing putty for balancing the rotation of a rotary part which includes an epoxy resin, a curing agent capable of curing the epoxy when it is heated to a temperature of 60 degrees C or higher, a first inorganic filler, and a second inorganic filler. Further, another patent issued to Ibe et al., namely U.S. Pat. No. 5,201,248, discloses a one-pack type liquid epoxy resin composition for balancing rotators which comprises an epoxy resin, a curing agent, a curing accelerator, an inorganic filler, and a thixotropic agent as its main components.

U.S. Pat. No. 5,384,339 issued to Starkey also discloses an epoxy based balancing compound. This patent describes a balancing compound having an epoxy resin, a photo initiator for curing the resin at an ambient temperature upon the application of ultraviolet light, and a filler to give the compound a certain specific gravity. Another patent, U.S. Pat. No. 5,516,813, also issued to Starkey describes a similar epoxy based ultraviolet light curable balancing composition which includes an epoxy resin, a photo initiator for curing the resin at ambient temperatures upon applying ultraviolet light, and a filler comprising ultraviolet light transparent quartz in certain amounts by weight to give the composition a specific gravity above 1.1.

However, the present invention relates even closer to U.S. Pat. No. 3,939,020 issued to Caramanian et al. U.S. Pat. No. 3,939,020 describes a method for balancing a rotor which uses an epoxy resin balancing composition that includes an epoxy resin, a fibrous inorganic material, a powdered weighting material, a reactive polyamide, a catalyst and a diluent. Further, another patent issued to John Caramanian, namely U.S. Pat. No. 4,083,735, discloses a method and composition for dynamically balancing rotors which includes the application of a balancing composition that comprises essentially the same elements as U.S. Pat. No. 3,939,020 with the exception that the elements exist in different concentrations by percent weight, there is no diluent, and the resulting composition must have a specific gravity of at least 3.0. In both Caramanian patent references, the epoxy resin is an epichlorhydrin-bisphenol A epoxy resin and the powdered weighting material is selected from either powdered zinc or powdered barium sulfate.

As described in the above-referenced Caramanian patents, dynamic balancing equipment is used to rotate the rotator in order to determine the required amount and placement position of the balancing composition in order to balance the rotor. Next, the determined amount of balancing composition is applied to the determined position of the rotor such that the balancing composition adheres to the rotor. The rotor is then rotated and dynamically tested to determine correct balancing. If the balancing is incorrect, either a portion of the balancing composition is removed from the rotor or balancing composition is added to the rotor in order to balance the rotor.

The present invention is directed to improved chemical compositions for dynamic balancing which include an epoxy resin, powdered barium sulfate as a weighting material, iron oxide pigment or other color pigments, and an expanded aramid fiber. Variations of this improved chemical composition are also contemplated by this invention which comprise the inclusion of one or more additional curing agents, specifically a polyamide, a polyamine, or a combination thereof, and/or additional pigments.

The improved compositions of the present invention result in improved characteristic properties over the compositions currently existing in the prior art, as well as certain procedural and formulational advantages which relate to the improved compositions. Some of those improved characteristics and advantages are as follows:

(i) The improved balancing compositions of the present invention are easier to mix and amounts of time required to mix the compositions are reduced by as much as fifty percent.

(ii) The improved balancing compositions of the present invention eliminate asbestos, zinc powder, calcium silicate, and the high boiling aromatic compounds, which were previously used with the existing prior art balancing compositions, making the improved compositions more user friendly and environmentally safe.

(iii) The improved balancing compositions of the present invention eliminate the need for overlaying the balancing compound in an armature with pressure sensitive tapes, or other tapes, to hold the balancing compound in place.

(iv) The improved balancing compositions of the present invention are applied after the armatures are varnish dipped, in contrast to before the armatures are varnish dipped as was the case with the existing prior art compounds. In that varnish dipping throws off the balance of the rotor, applying the balancing composition after varnish dipping provides for improved, more concise balancing.

(v) The facile mixing of the improved balancing compositions of the present invention make it both feasible and possible for these compositions to be used in specially designed mixing and dispensing equipment, thereby opening up new markets in the balancing field previously not accessible to a hand mixed, hand applied product.

(vi) The improved balancing compositions of the present invention may be processed through a machine that heats the composition, or not, mixes the composition, cools the composition, or not, and then dispenses the composition in preset or predetermined amounts or shots. Further, this type of mixing/dispensing machine may be coupled to a dynamic balancing machine, which determines the required amount and placement position of the balancing composition, so that the dispensed shots are of an amount equal to, or the same as, the amount previously determined by the dynamic balancing machine.

(vii) Because of their improved mixing qualities, the improved balancing compositions of the present invention may be dispensed through either manual or power actuated, high performance, plural component cartridge or plural component dispensing systems.

(viii) The improved balancing compositions of the present invention drastically reduce the time required for balancing. The new compositions may eliminate the necessity of trial balance, eliminate many weight location problems, and can be rotated and balanced in the uncured state. Some embodiments of the composition also cure much more quickly than those compositions disclosed in the prior art thereby reducing the waiting time required for motor assembly.

(ix) The improved balancing compositions of the present invention are non-conductive and thereby eliminate the possibility of electrical shorting due to balancing.

SUMMARY OF THE INVENTION

It is a principle object of the present invention to provide an improved composition for dynamic balancing.

It is another object of the present invention to provide an improved epoxy based composition for balancing rotors or the like, such as armatures of motors, fan blades, blowers, computer spindles, fractional horsepower motors and large motors, printing rollers, paint rollers, and any other rotating elements requiring balancing.

It is yet another object of the present invention to provide an improved epoxy based composition for dynamic balancing which uses a polyamide for a curing agent.

It is still another object of the present invention to provide an improved composition for dynamic balancing which can be easily mixed and dispensed through manual or power actuated high performance dispensing systems.

Yet another object of the present invention is to provide an improved composition for dynamic balancing that is user friendly and environmentally safe. Still another object of the present invention is to provide an improved composition for dynamic balancing which exhibits more superior and concise balancing over that of the prior art.

It is yet another object of the present invention to provide an improved composition for dynamic balancing which has an increased pot life over prior art balancing compounds.

It is still another object of the present invention to provide an improved composition for dynamic balancing that has a reduced or extended cure time over prior art balancing compounds.

It is yet another object of the present invention to provide an improved composition for dynamic balancing which results in an increase in cost savings due to a drastic reduction in the time required for balancing.

It is finally an object of the present invention to provide an improved composition for dynamic balancing which is non-conductive thereby eliminating the possibility of electrical shorting resulting from the balancing.

In brief, the improved balancing compositions of the present invention include two components, Component A which contains an epoxy resin and Component B which contains a curing agent for setting the epoxy resin. The components are adapted to be mixed with one another in equal parts by either weight or volume. Component A of all of the preferred embodiments of the improved balancing composition of the present invention includes an epoxy resin, powdered barium sulfate, iron oxide pigment, and aramid fiber. Component B of a first preferred embodiment of the improved balancing composition of the present invention includes powdered barium sulfate aramid fiber, a polyamide curing agent, a polyamine curing agent, titanium dioxide, and blue or other color pigment. A second preferred embodiment of the improved balancing composition of the present invention includes a Component B which comprises powdered barium sulfate, aramid fiber, a polyamide curing agent, and titanium dioxide. Further, a third preferred embodiment of the improved balancing composition of the present invention includes a Component B which comprises powdered barium sulfate, aramici fiber, a polyamine curing agent, and yellow or other color pigment.

DETAILED DESCRIPTION OF THE PREFERRED EMBODIMENTS

The improved compositions for dynamic balancing of the present invention include an epoxy resin component (Component A) and a curing agent component (Component B). Both Components A and B are mixed to arrive at a desired balancing composition, e.g., in equal parts by volume or weight. Exemplary ranges for the ingredients and preferred formulations for Components A and B of the improved dynamic balancing compositions of the present invention are as follows (percentages presented below indicate weight percent unless otherwise indicated):

| Ingredient | Range | Preferred Formulation |
| --- | --- | --- |
| Example I | | |
| Component A: | | |
| epoxy resin (Shell Epon 828) | 10%–20% | 16.81% |
| powdered barium sulfate | 50%–90% | 81.24% |
| iron oxide pigment | 0%–10% | 1.75% |
| parts expanded aramid fiber | 0%–0.50% | 0.20% |
| Component B (includes an accelerator): | | |
| polyamide curing agent | 0%–20% | 7.87% |
| polyamine curing agent | 0%–20% | 7.87% |
| powdered barium sulfate | 70%–90% | 83.93% |
| titanium dioxide | 0%–10% | 0.18% |
| expanded aramid fiber | 0%–5% | 0.14% |
| blue pigment | 0%–0.50% | 0.01% |
| Example II | | |
| Component A: | | |
| epoxy resin | 10%–20% | 16.81% |
| powdered barium sulfate | 70%–90% | 81.24% |
| iron oxide pigment | 0%–10% | 1.75% |
| expanded aramid fiber | 0–0.50% | 0.20% |
| Component B: (does not include an accelerator) | | |
| polyamide curing agent | 10%–20% | 17.08% |
| powdered barium sulfate | 70%–90% | 82.52% |
| titanium dioxide | 0%–10% | 0.20% |
| expanded aramid fiber | 0%–0.50% | 0.20% |
| Example III | | |
| Component A: | | |
| epoxy resin | 10%–20% | 16.81% |
| powdered barium sulfate | 70%–90% | 81.24% |
| iron oxide pigment | 0%–10% | 1.75% |
| expanded aramid fiber | 0–0.50% | 0.20% |
| Component B (includes fast acting curing agent): | | |
| polyamine curing agent | 10%–20% | 14.95% |
| powdered barium sulfate | 70%–90% | 84.75% |
| yellow pigment | 0%–10% | 0.142% |
| expanded aramid fiber | 0%–0.5% | 0.138% |

The above examples comprise preferred formulas for the improved dynamic balancing compositions of the present invention. However, percentages of the above elements which constitute the components may vary, as well as the suppliers of the various elements.

The epoxy resin of Component A can be the commercial product known as Shell Epon 828, a trade name of Shell Oil Company. This product has an epoxy base of bisphenol A-epichlorhydrin type having an epoxy equivalent of 185 to 192 and an average molecular weight of 300 to 400. Shell Epon 828 is a standard in epoxy resin formulation. When cross-linked or hardened with appropriate curing agents, it exhibits excellent mechanical, adhesive, electrical and chemical resistance properties. Other examples of suitable epoxy resins are Reichhold Chemical's 37-140 epoxy resin and Pacific Epoxy Products' epoxy resin PEP-6128. The epoxy resin of Component A may also be supplied by other manufacturers including, but not limited to, manufacturers such as Ciba, Dow, and Celanese. Any epoxy resin of a bisphenol A epichlorhydrin type having an epoxy equivalent of about 185–238 and an average molecular weight of about 300–400 will suffice as the epoxy resin for Component A.

Huberbrite #7, a trade name of J. M. Huber Corporation, is the preferred powdered barium sulfate for both Components A and B of the improved dynamic balancing compositions of the present invention. However, other grades and mineral fillers may also be used. Nevertheless, other fillers may prove to be conductive, too cost prohibitive, or simply not heavy enough to obtain the required specific gravity.

Many of the color pigments employed are simply color indicators to signify thorough mixing, and may replaced with other color pigments. It should be understood that any number of colors may be employed in using the colored pigment. However, the iron oxide colored pigment, which may be manufactured by Harcros Pigments, serves to approximate the color of round copper coils located on various motors. Accordingly, although iron oxide pigment is a preferred pigment, other pigments may be employed to achieve a deep red or reddish color closely approximating the color of natural copper windings to which the improved dynamic balancing compositions of the present invention are applied. The colors may require the use of additional tint pigments such as, but not limited to, carbon black, burnt umber and phthalocyanine or iron blues. Further, some of the other color pigments that may be used are the toluidine reds, maroons, calcium lithol reds, lithol rubine reds, brilliant reds and molybdate, chrome and nitraniline oranges.

It should also be understood that the Components A and B and their resulting compositions may also be produced without the addition of any pigments. The elimination of pigments will not affect the overall chemical properties and characteristics of the dynamic balancing compositions. Nevertheless, use of the iron oxide pigment or any other reddish pigment is preferred in order to approximate the color of the coils to which the compositions are applied.

The polyamide functions as a curing agent or hardener and can be a reactive polyamide resin having an amino equivalent of about 200 to about 300 known as Shell V-15, a trade name product of Shell Oil Company. The polyamide also helps make the balancing compositions sticky or tacky and adherent whereby the compositions can be easily affixed to the rotor or spindle being dynamically balanced. Similar substitutions for the curing agents may also be used. For example, Shell's polyamide V-1i5 may be replaced with Reichhold's like-kind product 37-615 or Pacific Epoxy Products' PEP-9115. Other room temperature, 100% solids curing agents may also be used in place of, or in conjunction with, the polyamide hardeners such as:

Cycloaliphatic Polyamine hardeners
Modified Polyamine hardeners
Amido Amine hardeners
Amine hardeners
Amido Polyamine hardeners
Tertiary Amine hardeners
Aliphatic Amine hardeners
Aromatic Amine hardeners The polyamine curing agent, when used in conjunction with the polyamide curing agent as shown in Example I, functions as an accelerator for the curing agent. Alternatively, when used alone, as in Example III, the polyamine curing agent simply functions as a fast reacting curing agent.

In accordance with preferred exemplary embodiments of the present invention, mixing of the improved dynamic balancing compositions of the present invention is done in equal parts, by either weight or volume, of Component A and Component B until the resulting mass is of uniform color. A small hand operated meat grinder can facilitate the mixing. Commercial mixers can also be used for large quantity mixing. Each of the balancing compositions forms a tacky, sticky mass which readily sticks firmly to rotor or spindle parts and is easy to handle and manipulate as pieces or plastic lumpy masses. During use, portions of the balancing composition can be secured at appropriate places on the rotor or spindle during balancing. Wetting ones fingers after initial placement of the material, or using any other wetting means, and repressing the balancing compound increases adhesion to smooth surfaces. After attaching portions of the composition, the rotor is rotated to determine if the balancing has been properly accomplished. If not properly balanced, portions of the balancing composition are then moved, added, or subtracted. The rotor is then dynamically tested again and the removal and addition process is repeated until the proper final balance is achieved. If the amount of imbalance is known, the composition may be pre-weighed and applied to the point of imbalance.

The improved dynamic balancing compositions of the present invention may be used to "trim" balance for large amounts of imbalance, balance fractional horsepower and large motors, balance fans and blowers, balance computer spindles, balance rollers of all types, and balance any other rotating elements that require balancing. Further, great cost saving can be achieved by using the improved dynamic balancing compositions of the present invention. Use of the improved dynamic balancing compositions of the present invention can save as much as 60% of the balancing time of current balancing methods. The improved compositions for dynamic balancing eliminate the necessity of trial balance and eliminate the possibility of electrical shorting due to balancing because the compositions are non-conductive. The improved balancing compositions of the present invention also eliminate many weight location problems and can be rotated and balanced in the uncured state. Finally in the improved compositions defined in Examples I and III above, the balancing compositions cure quickly thereby reducing the waiting time required when assembling motors. However, it should also be noted that all of the above examples have the capability of being heat cured up to 250 degrees F.

When Components A and B of the various Examples are mixed together, they produce a soft plastic mass. For example, the preferred formulation illustrated in Example I includes:

16.81 parts epoxy resin
165.17 parts powdered barium sulfate
7.87 parts polyamide curing agent -continued

```
    7.87  parts polyamine curing agent
    1.75  parts iron oxide pigment
    0.18  parts titanium dioxide
    0.34  parts expanded aramid fiber
    0.01  parts blue pigment 200.00  parts, where parts represent an amount of weight
```

Example I comprises a two-part epoxy putty which is specifically formulated for applications that require a more rapid cure time such as where fast motor assembly is required or needed. The compound of Example I is a room temperature, fast curing balancing compound with a working or pot life of approximately sixty minutes. The composition cures hard in approximately 90 minutes at a temperature of 72 degrees F. No changes occur during the cure except for hardening. The shelf life of the sperate components is approximately one year in closed cans at room temperature.

Research performed on the composition of Example I has produced the following technical data:

```
Part "A":              Red Mastic
Part "B":              Light Blue
Specific Gravity:      2.5+
Shore D Hardness:      80 ± 10
Viscosity:             0 Slump ASTM D220273
Odor:                  Slight typical epoxy
Compressive Strength:  6000 PSI Min.
Shear Strength:        1500 PSI Min.
Tensile Strength:      1500 PSI Min.
Dielectric Strength:   450 volts per mil.
Coefficient of Thermal .00008 inches per inch per degree F.
Expansion:
Solids:                100%
```

The resulting balancing composition of the preferred formulation illustrated in Example II includes:

```
   16.81  parts epoxy resin
  163.76  parts powdered barium sulfate
   17.08  parts polyamide curing agent
    1.75  parts iron oxide pigment
    0.40  parts expanded aramid fiber
    0.20  parts titanium dioxide 200.00  parts, where parts again indicates an amount by weight
```

Example II comprises a two-part epoxy putty which can be heat cured up to 250 degrees F in an oven or with a heat gun in fifteen minutes or air cured at 72 degrees F in twelve hours. No changes occur during the cure except for hardening. The composition has a pot life of approximately three hours at 72 degrees F. The shelf life of the separate Components A and B is approximately one year in closed cans at room temperature.

Research performed on the composition of Example II has produced the following technical data:

```
Part "A":              Red Mastic
Part "B":              Off White Mastic
Specific Gravity:      2.73+
Shore D Hardness:      80 ± 10
```

-continued

```
Viscosity:             0 Slump ASTM D220273
Odor:                  Slight typical epoxy
Compressive Strength:  6000 PSI Min.
Shear Strength:        1500 PSI Min.
Tensile Strength:      1500 PSI Min.
Dielectric Strength:   450 volts per mil.
Coefficient of Thermal .00008 inches per inch per degree F.
Expansion:
Solids:                100%
```

The resulting balancing composition of the preferred formulation illustrated in Example III includes:

```
   16.81  parts epoxy resin
  166.01  parts powdered barium sulfate
   14.95  parts polyamine curing agent
    1.75  parts iron oxide pigment
    0.338 parts expanded aramid fiber
    0.142 parts yellow pigment 200.00  parts (by weight)
```

Example III comprises a two-part epoxy specifically formulated for dynamic weight addition balancing when only minimum cure time is available. The composition is a room temperature, fast curing balancing compound that has a working or pot life of fifteen to twenty minutes, and cures hard in twenty-five to thirty minutes at room temperatures of 72 degrees F. No changes occur during the cure time except for hardening. The shelf life of the separate Components is approximately one year in closed cans at room temperature.

Research performed on the composition of Example III has produced the following technical data:

```
Part "A":              Red Mastic
Part "B":              Yellow Mastic
Specific Gravity:      2.5+
Shore D Hardness:      80 ± 10
Viscosity:             0 Slump ASTM D220273
Odor:                  Slight typical epoxy
Compressive Strength:  6000 PSI Min.
Shear Strength:        1500 PSI Min.
Tensile Strength:      1500 PSI Min.
Dielectric Strength:   450 volts per mil.
Coefficient of Thermal .00008 inches per inch per degree F.
Expansion:
Solids:                100%
```

All of the above described improved compositions for dynamic balancing impart characteristics that open up new areas of use for dynamic balancing using dynamic balancing compositions. The improved dynamic balancing compositions of the present invention are easier to mix and eliminate asbestos, zinc powder, calcium silicate and the high boiling aromatics used with previous balancing compositions thereby making the compositions of the present invention more user and environmentally friendly.

The improved dynamic balancing compositions also eliminate the need for overlaying the balancing compound in an armature with pressure sensitive tapes or other tapes to hold the balancing compound in place. Instead, the dynamic balancing compositions of the present invention are applied after the armatures are dipped thereby providing better and more concise balancing.

The facility of mixing the improved dynamic balancing compositions of the present invention allows the compositions to be used in specially designed mixing and dispensing equipment thereby opening up new markets in the balancing field that were previously not accessible using a hand mixed, hand applied product. Further, other areas of production which typically utilize the drilling of holes to remove weight from an armature to achieve balance may now utilize the dynamic balancing compositions of the present invention due to the fact that there is no wait time required to cure the composition prior to balancing. This is particularly important given the current trend toward producing lighter, cheaper and smaller machines and armatures. These structures do not have the necessary integrity for removing weight by drilling holes and there may not be enough production time in an assembly line to allow for cure time before balancing.

The improved balancing compositions may flow through a machine which heats the compound, mixes and dispenses the compound in preset or predetermined amounts, and then cools the compound, as required, prior to actually dispensing the predetermined amount. More specifically, Components A and B may be heated, hydraulically pushed out of canisters, mixed, and then cooled before being extruded in preset amounts. When the balancing compositions of the present invention are used in such mixing/dispensing machines, the mixing/dispensing machine may be coupled to a dynamic balancing machine so that the dispensed amounts of composition are equal to, or the same as, the amount that the dynamic balancing machine has determined is required to achieve balance.

Because of their improved mixing qualities, the improved dynamic balancing compositions of the present invention may be dispensed through either manual or power actuated, high performance, plural component cartridge dispensing systems. Changing the types and amounts of fillers in the balancing compositions of the present invention can make the compositions higher in specific gravity while still maintaining their pumpable qualities.

While specific embodiments of the invention have been shown and described herein for purposes of illustration, the present invention is not strictly limited to the disclosed embodiments, but rather extends to all structures and arrangements which fall fairly within the scope of the claims which are appended hereto.

I claim:

1. A composition for balancing comprising:
   an epoxy resin component, wherein said epoxy resin component includes about 10 percent by weight to about 20 percent by weight epoxy resin about 50 percent by weight to about 90 percent by weight powdered barium sulphate, about 0 percent by weight to about 10 percent by weight iron oxide pigment, and about 0 to about 5 percent by weight fiber; and
   a curing agent component, wherein said curing agent component includes about 0 percent by weight to about 20 percent by weight polyamide curing agent, about 0 percent by weight to about 20 percent by weight polyamine curing agent, about 70 percent by weight to about 90 percent by weight powdered barium sulfate, and about 0 to about 5 percent by weight fiber.

2. The composition according to claim 1, wherein said polyamide has an amino equivalent of about 200 to about 300.

3. The composition according to claim 1, wherein said curing agent further comprises a colorant.

4. The composition according to claim 1, wherein said curing agent component includes about 10 percent by weight to about 20 percent by weight polyamide curing agent, about 70 percent by weight to about 90 percent by weight powdered barium sulfate, and about 0 percent by weight to about 0.5 percent by weight expanded aramid fiber.

5. The composition according to claim 1, wherein said epoxy resin has an epoxy equivalent of about 185–238 and an average molecular weight of about 300–400.

6. A composition for balancing to be applied to an apparatus, said composition comprising:
   a curing agent component including about 0 to about 20 percent by weight polyamide curing agent, about 0 percent by weight to about 20 percent by weight polyamide curing agent, about 70 percent by weight to about 90 percent by weight barium sulfate, and fiber.

7. The composition according to claim 6, further comprising an epoxy resin component.

8. The composition according to claim 7, wherein said epoxy resin component includes expanded aramid fiber.

9. The composition according to claim 7, wherein at least one of said epoxy resin component and said curing agent includes a colorant.

10. The composition according to claim 7, wherein said epoxy resin component includes about 50 percent to about 90 percent by weight barium sulfate.

11. The composition according to claim 7, wherein said epoxy resin component includes about 10 percent to about 20 percent by weight epoxy resin.

12. The composition according to claim 6, wherein said curing agent component includes about 0 percent to about 10 percent by weight iron oxide pigment.

13. The composition according to claim 6, wherein said curing agent component includes about 0.20 percent by weight expanded aramid fiber.

14. A composition for balancing comprising:
   about 10 to about 20 percent by weight epoxy resin; about 50 to about 90 percent by weight barium sulfate; and fiber.

15. The composition according to claim 14, further comprising about 5 to about 10 percent by weight polyamide curing agent.

16. The composition according to claim 14, further comprising about 5 percent by weight to about 10 percent by weight polyamine curing agent.

17. The composition according to claim 14, further comprising a colorant.

18. The composition according to claim 17, wherein said colorant includes iron oxide pigment.

* * * * *